United States Patent [19]

Kosaka et al.

[11] 3,950,209

[45] Apr. 13, 1976

[54] PROCESS FOR PREPARING CARBOXYLATED POLYMER COMPOSITION

[75] Inventors: Yujiro Kosaka; Masaru Uemura; Mitsutaka Saito; Yuji Suzuki, all of Shin Nanyo, Japan

[73] Assignee: Toyo Soda Manufacturing Co., Ltd., Yamaguchi, Japan

[22] Filed: Oct. 17, 1974

[21] Appl. No.: 515,546

Related U.S. Application Data

[63] Continuation-in-part of Ser. No. 369,597, June 13, 1973, abandoned.

[30] Foreign Application Priority Data

June 13, 1972 Japan.............................. 47-58888

[52] U.S. Cl. ............... 156/333; 156/327; 156/332; 260/878 R; 428/522
[51] Int. Cl.² ....................................... C08F 263/04
[58] Field of Search.......... 260/878 R; 156/327, 332

[56] References Cited

UNITED STATES PATENTS

| | | | |
|---|---|---|---|
| 3,737,483 | 6/1973 | Kosaka et al. ................. | 260/878 R |
| 3,749,756 | 7/1973 | Kosaka et al. ................. | 260/878 R |
| 3,808,294 | 4/1974 | Sato et al. ..................... | 260/878 R |
| 3,838,079 | 9/1974 | Kosaka et al. ................. | 260/878 R |
| 3,853,970 | 12/1974 | Dietrich ......................... | 260/878 R |
| 3,856,733 | 12/1974 | Sturt et al. ..................... | 260/878 R |

*Primary Examiner*—Alan Holler
*Attorney, Agent, or Firm*—Oblon, Fisher, Spivak, McClelland & Maier

[57] ABSTRACT

Substrates are bonded by applying to a substrate a graft copolymer of 0.1 – 20 parts by weight of an unsaturated carboxylic acid or anhydride, 1 – 40 parts by weight of a vinyl monomer containing at least one chlorine atom in the presence of 99 – 40 parts by weight of an ethylene-vinylacetate copolymer.

6 Claims, No Drawings

1

PROCESS FOR PREPARING CARBOXYLATED POLYMER COMPOSITION

CROSS REFERENCE TO RELATED APPLICATIONS

This application is a continuation-in-part of application Ser. No. 369,597, filed June 13, 1973, now abandoned.

BACKGROUND OF THE INVENTION

1. Field of the Invention

This invention relates to a process for preparing a novel ethylene graft polymer composition which has substantial adhesiveness and which is useful as a polymer base for adhesive and coating compositions. More particularly, this invention relates to a process for preparing a polymer composition containing a graft polymer wherein an unsaturated carboxylic acid or acid anhydride is copolymerized with a vinyl monomer containing at least one chlorine atom in the presence of an ethylene-vinylacetate copolymer, preferably together with an olefin or a vinyl ester.

2. Description of the Prior Art

Ethylene-vinylacetate copolymers have various desirable characteristics such as excellent softness, elasticity, adhesiveness, miscibility, moldability, transparency, low temperature flexibility, and the like. With the development of the technological base concerning ethylene-vinylacetate copolymers, new applications for the copolymer have developed in areas such as molding compounds, adhesives, polymer modifiers, and the like. However, simultaneous with the development of new applications of the copolymers has been a need for improvements in the characteristics of the ethylene-vinylacetate copolymers such as in the adhesiveness, solvent resistance, and heat resistance. Polymers having improved adhesiveness in the past have been prepared by polymerizing ethylene, vinyl acetate and unsaturated carboxylic acids by introducing polar groups in the ethylene polymer as described in Japanese Patent Publication No. 8683/1964.

However, a need still exists for ethylene-vinylacetate copolymers which have improved adhesive, solvent resistant and heat resistant characteristics over those copolymers of the past.

SUMMARY OF THE INVENTION

Accordingly, one object of the present invention is to provide an ethylene-vinylacetate copolymer which possesses improved adhesive properties.

Briefly, this object and other objects of the invention as hereinafter will become readily apparent can be attained by producing a method of bonding substrates which comprises: applying to a first substrate a graft copolymer which comprises a polymer of 0.1 – 20 parts by weight of an unsaturated carboxylic acid or anhydride, and 1–40 parts by weight of a vinyl monomer containing at least one chlorine atom, which is grafted onto 99 – 40 parts by weight of an ethylene-vinylacetate copolymer, and bonding a second substrate thereto.

DETAILED DESCRIPTION OF THE PREFERRED EMBODIMENTS

In the preparation of the polymer composition of this invention, a predetermined amount of ethylene-vinylacetate copolymer, the unsaturated carboxylic acid or anhydride, the vinyl monomer containing at least one chlorine atom, and preferably an olefin or a vinyl ester are dissolved or swelled or dispersed in a hydrocarbon solvent or in the monomer mixture itself. Then a radical reaction initiator is added to the mixture to polymerize the components to yield the polymer. The amount of each starting monomer that is used is dependent only on the use intended for the product. Preferably, the monomers are used in an amount sufficient to provide from 0.1 – 20 parts by weight unsaturated carboxylic acid and from 1 – 40 parts by weight of a vinyl monomer containing at least one chlorine atom in the final product. The polymerized monomers are grafted onto 99 – 40 parts by weight of an ethylene-vinylacetate copolymer. The grafted polymer may contain from 0.1 – 20 parts by weight of an additional olefin or vinyl ester thereon.

The base polymer upon which the monomers are grafted is the ethylene-vinylacetate copolymer stated above. The ethylene-vinylacetate copolymer used for this purpose can be prepared by conventional high pressure processes under pressures from 1000 – 3000 atmospheres or by conventional solution procedures or emulsion polymerization procedures under pressures of from 100 – 400 atmospheres. The vinylacetate unit content in the parent ethylene-vinylacetate copolymer is usually in the range of 5 – 70 weight percent, especially 10 – 40 weight percent. The molecular weight of the ethylene-vinylacetate copolymer is not critical, and preferably has a melt index in the range of 0.1 – 500 g/10 min.

The acidic monomers used in the preparation of the polymer of this invention are suitable unsaturated carboxylic acids or anhydrides, especially $\alpha,\beta$-unsaturated carboxylic acids or anhydrides, such as acrylic acid, methacrylic acid, maleic acid, fumaric acid, itaconic acid, the acidic methyl or ethyl ester of maleic acid, fumaric acid, and the like; maleic anhydride, itaconic anhydride, acrylic anhydride, and the like. It is especially preferable to use maleic anhydride, acrylic acid, methacrylic acid, and the like as the acidic monomer. These monomers can be used singly or in combinations thereof.

Suitable vinyl monomer containing at least one chloride atom include vinyl chloride, vinylidene chloride, allylchloride and methallyl chloride. From the viewpoint of economy, availability and effectiveness, optimum polymers are attained when vinyl chloride is used.

Suitable olefins used in this invention include ethylene, propylene, isobutene, butene-1, 4-methylpentene-1, octene-1, and the like. Suitable vinyl esters used in this invention include vinyl esters of lower-saturated-mono basic carboxylic esters such as vinyl acetate, vinyl formate, vinylpropionate, vinyl pivalate and vinyl benzoate.

Suitable polymerization initiators used in the preparation of the copolymer of this invention are the conventional radical initiators which include organic peroxides such as the conventional dialkyl peroxides including dicumyl peroxide and di-t-butyl peroxide; peroxy esters including t-butylperoxybenzoate, t-butylperoxyoctoate, t-butylperoxy acetate, t-butylperoxy isobutyrate and t-butylperoxy propanoate, and diacylperoxides including lauroylperoxide, benzoylperoxide, acetylperoxide; and azo compounds such as azobisisobutyronitrile. Preferably, organic peroxides such as peroxy esters are used to initiate the reaction. The radical initiator is used in quantities preferably in the range of about 0.1 – 10 weight percent based on the total monomer content. The polymerization reaction is conducted at about room temperature in a range from 0° – 50°C.

The polymerization can be carried out using conventional solution, suspensions, emulsion or bulk polymerization procedures. If the solution polymerization process is used, it is preferable to use a solvent of an aromatic hydrocarbon such as benzene, toluene, xylene, and the like; an aliphatic hydrocarbon such as kerosene, hexane, petroleum ether, and the like; or a chlorinated hydrocarbon such as 1,2-dichloroethane, and the like to dissolve the ethylene-vinylacetate copolymer.

Of course the end product of the polymerization process may contain some quantity of a copolymer of the monomers which form the grafted polymer.

The copolymer compositions have various physical properties which depend upon the types and amounts of components used. Specific characteristic properties are introduced into the copolymer depending upon the carboxyl group containing compound incorporated in the copolymer. The adhesiveness of the ethylene-vinylacetate copolymer is substantially improved by the carboxyl group introduced by the unsaturated carboxylic monomer and the polar group introduced by the vinyl monomer containing a chlorine atom or the vinyl ester.

When the olefin or vinyl ester is introduced into the polymer composition, improved molecular weight control of the grafted chain is achieved and the solubility of the polymer composition in suitable solvents is improved.

An outstanding property of the polymer composition of the present invention is its non-polarity which results in strong bonds to both smooth surfaced polyolefins as well as to metals. For example, in one of the many applications of the copolymer, the composition is coated on an iron, copper, aluminum or stainless steel substrate to form a strongly adhering coating on the metal, and then a plastic such as polyethylene, polypropylene, polystyrene, or the like is heat-bonded to the coated metal to prepare a very useful product.

Having generally described the invention, a more complete understanding can be obtained by reference to certain specific examples, which are included for purposes of illustration only and are not intended to be limiting unless otherwise specified.

EXAMPLE 1

Into a 2 liter autoclave equipped with a stirrer was charged a composition containing the following components, and a graft polymerization reaction was conducted.

| Ethylene-vinylacetate copolymer (vinylacetate content 31% - melt index 30 g/10 min.) | 300 g |
|---|---|
| Vinyl chloride | 50 g |
| Maleic anhydride | 5 g |
| Acrylic acid | 20 g |
| Toluene | 1,000 g |
| t-Butylperoxyoctoate | 2 ml |

The ethylene-vinylacetate copolymer was first charged into the autoclave which was purged with nitrogen gas, and then maleic anhydride, acrylic acid and toluene were added. Finally, vinylchloride was added after the gas was vented from the autoclave. After stirring at 80°C for 1 hour, the polymerization initiator was added to initiate the graft polymerization. The polymerization was conducted at 80°C for 7 hours to yield 340 g of a polymer composition.

The resulting polymer composition was dissolved in toluene to yield a solution having a viscosity of 175 cps/25°C in a concentration of 15% and the solution was coated on aluminum foil. The coated aluminum foil was heat-adhered to the following films of a thickness of 5 microns, and the bonding strength in each case was measured. In the comparison tests, in the right-hand column the base ethylene-vinylacetate (EVA) was used alone instead of the polymer composition.

| Film | Bonding Strength (G/15mm) | |
|---|---|---|
| | Copolymer of Example 1 | Base EVA |
| Aluminum foil | 500 | 50 |
| Biaxially stretched polypropylene | 850 | 250 |
| Biaxially stretched polystyrene | 750 | 350 |
| Monoaxially stretched high density polyethylene | 600 | 350 |
| Nylon | 360 | 20 |
| Rigid polyvinyl chloride | 750 | 100 |
| Plasticized polyvinyl chloride | 500 | 30 |

The heat seal conditions were as follows:

| sealing temperature: | 150°C |
|---|---|
| sealing pressure: | 5 kg/cm$^2$ |
| sealing time: | 1 second |

It is clear from these results that the polymer composition of this invention has superior adhesive properties than the base ethylene-vinylacetate copolymer alone.

EXAMPLE 2

In accordance with the process of Example 1, the following components were charged into a 2 liter autoclave and a graft-polymerization reaction was conducted.

| Ethylene-vinylacetate copolymer (vinylacetate content 40% - melt index 65 g/10 min.) | 300 g |
|---|---|
| Vinyl chloride | 70 g |
| Maleic anhydride | 10 g |
| Toluene | 1,000 g |
| t-Butylperoxy pivalate (70% isoparaffin solution) | 2 ml |

The graft polymerization reaction was conducted at 65°C for 10 hours to yield 351 g of the polymer composition.

As in Example 1, a 15% toluene solution of the polymer composition having a viscosity of 120 cps at 25°C was coated on an aluminum foil. The coated aluminum foil was heat-adhered to a biaxially stretched polypropylene film and the adhesiveness was measured.

bonding strength 1200 g/15 mm (polymer composition thickness of 5 μ)

In a comparison test, when the base ethylene-vinylacetate copolymer of this invention was used alone instead of the polymer composition, the adhesive strength was as follows:

bonding strength 250 g/15 mm (copolymer thickness of 5 μ)

EXAMPLE 3

Into a 2 liter autoclave was charged the following components and a graft-polymerization reaction was conducted.

| | |
|---|---|
| Ethylene-vinylacetate copolymer (vinylacetate content 28% - melt index 400 g/10 min.) | 300 g |
| Vinyl chloride | 50 g |
| Vinylacetate | 50 g |
| Maleic anhydride | 5 g |
| Acrylic acid | 20 g |
| Toluene | 1,000 g |
| t-Butylperoxyoctoate | 2 ml |

The graft polymerization was conducted at 80°C for 6 hours to yield 390 g of the polymer composition.

As in Example 1, a 20% toluene solution of the polymer composition having a viscosity of 163 cps/25°C was coated on an aluminum foil. The coated aluminum foil was heat-adhered with a biaxially stretched polypropylene film and the adhesiveness was measured.

bonding strength   650 g/15 mm

In a comparison test, when the base ethylene-vinylacetate copolymer of this invention was used alone instead of the polymer composition, the adhesiveness was as follows:

bonding strength   150 g/15 mm

EXAMPLE 4

Into a 500 ml autoclave equipped with an electromagnetic stirrer, the following components were charged and a graft polymerization was conducted.

| | |
|---|---|
| Ethylene-vinylacetate copolymer (vinylacetate content 40% - melt index 450 g/10 min.) | 75 g |
| Vinyl chloride | 75 g |
| Ethylene | 50 g |
| Maleic anhydride | 2 g |
| 1,2-Dichloroethane | 200 g |
| Benzoylperoxide | 2 g |

In the autoclave purged with nitrogen gas, the components listed above except ethylene and vinylchloride were added. The autoclave was evacuated and then ethylene and vinylchloride were added. The mixture was stirred at room temperature for 3 hours to dissolve the solid components, and a graft polymerization reaction was conducted at 80°C for 6 hours to yield 155 g of the polymer composition.

As in Example 1, a 20% toluene solution of the polymer composition having a viscosity of 130 cps/25°C was coated on an aluminum foil. The coated aluminum foil was heat-adhered with a biaxially stretched polypropylene film and the adhesiveness was measured.

bonding strength   1050 g/15 mm

In a comparison test, when the base ethylene-vinylacetate copolymer of this invention was used alone instead of the polymer composition, the adhesive strength was as follows:

bonding strength   200 g/15 mm

EXAMPLE 5

Into a 2 liter autoclave equipped with a stirrer was charged a composition containing the following components, and a graft polymerization reaction was conducted.

| | |
|---|---|
| Ethylene-vinylacetate (vinylacetate content 31% - melt index 30 gr/10 min.) | 300 g |
| Vinylchloride | 50 g |
| Fumaric acid | 10 g |
| Acrylic acid | 20 g |
| 1,2-dichloroethane | 1,000 g |
| t-butylperoxy acetate | 1 ml |
| t-butylperoxy pivalate | 1 ml |

The procedure of Example 1 was followed, and the polymerization was conducted at 80°C for 7 hours to yield 335 g of a polymer composition.

The resulting polymer composition was dissolved in toluene to yield a solution having a viscosity of 210 cps at 25°C in a concentration of 15% in toluene solution, and the solution was applied to a biaxially stretched polypropylene with a film thickness of 5 μ.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of bonding substrates, which comprises: applying to a first substrate a graft copolymer which comprises a polymer of 0.1 – 20 parts by weight of an unsaturated carboxylic acid or anhydride monomer, and 1 – 40 parts by weight of a vinyl monomer containing at least one chlorine atom, which is grafted onto 99 – 40 parts by weight of an ethylene-vinylacetate copolymer, and bonding a second substrate thereto.

2. The method of claim 1, wherein the vinylacetate content of said ethylene-vinylacetate copolymer is in the range of 5 – 70 weight percent.

3. The method of claim 2, wherein the vinylacetate content of said ethylene-vinylacetate copolymer is in the range of 10 – 40 weight percent.

4. The method of claim 1, wherein said unsaturated carboxylic acid or anhydride is acrylic acid, methacrylic acid, maleic acid, fumaric acid, itaconic acid or acidic esters or anhydrides thereof.

5. The method of claim 1, wherein said vinyl monomer containing at least one chloride atom is vinyl chloride, vinylidene chloride, allyl-chloride or methallylchloride.

6. The method of claim 1, wherein an olefin or vinyl ester is added to said monomers and grafted onto said copolymer in amounts ranging from 0.1 – 20 parts by weight based on the grafted polymer.

* * * * *